United States Patent [19]
Rutenbeck et al.

[11] Patent Number: 4,810,829
[45] Date of Patent: Mar. 7, 1989

[54] CABLE CLOSURE

[75] Inventors: Mark M. Rutenbeck, Clinton, Iowa; Kenneth D. Rebers; William J. Seim, both of Austin, Tex.

[73] Assignee: Minnesota Mining and Manufacturing Co., St. Paul, Minn.

[21] Appl. No.: 131,758

[22] Filed: Dec. 11, 1987

[51] Int. Cl.[4] .................................... H02G 15/113
[52] U.S. Cl. ................................ 174/41; 174/91; 174/92; 174/93
[58] Field of Search ............... 174/41, 92, 93, 91; 220/420

[56] References Cited

U.S. PATENT DOCUMENTS

| | | | |
|---|---|---|---|
| 2,771,502 | 11/1956 | King et al. | 174/92 |
| 3,088,495 | 5/1963 | Svec | 174/DIG. 11 |
| 3,209,067 | 9/1965 | Channell et al. | 174/93 |
| 3,663,740 | 5/1972 | Dellett | 174/92 |
| 3,692,926 | 9/1972 | Smith | 174/92 |
| 3,701,835 | 10/1972 | Eisele et al. | 174/41 |
| 3,711,633 | 1/1973 | Ghirardi et al. | 174/92 X |
| 3,816,642 | 6/1974 | Toedtman et al. | 174/138 F |
| 3,836,694 | 9/1974 | Kapell | 174/22 |
| 4,079,193 | 3/1978 | Channell | 174/138 F |
| 4,153,178 | 5/1979 | Weavers | 220/306 |
| 4,211,337 | 7/1980 | Weavers et al. | 220/341 |
| 4,262,168 | 4/1981 | Bossard | 174/77 R |
| 4,392,014 | 7/1983 | Trumble et al. | 174/92 |
| 4,486,620 | 12/1984 | Ball et al. | 174/41 |
| 4,538,021 | 8/1985 | Williamson, Jr. | 174/92 |
| 4,581,265 | 4/1986 | Follette | 428/36 |
| 4,610,921 | 9/1986 | Follette | 428/304.4 |
| 4,694,118 | 9/1987 | Schmidt | 174/77 R X |
| 4,701,574 | 10/1987 | Shimirak et al. | 174/93 |
| 4,703,853 | 11/1987 | Byrns | 206/387 |
| 4,704,499 | 11/1987 | Faust | 174/92 |
| 4,721,830 | 1/1988 | Dagan et al. | 174/41 |

FOREIGN PATENT DOCUMENTS

| | | |
|---|---|---|
| 1602657 | 2/1971 | France . |
| 2301119 | 9/1976 | France . |
| 56-63231 | 5/1981 | Japan . |
| 58-28434 | 6/1983 | Japan . |
| 913727 | 12/1962 | United Kingdom . |

OTHER PUBLICATIONS

G-A-T-M - 5000 Series Aerial Terminal.
3M - Aerial Closure System
Hawk (C-2350 Series) Communications Technology brochure.

*Primary Examiner*—Morris H. Nimmo
*Attorney, Agent, or Firm*—Merchant, Gould, Smith, Edell, Welter & Schmidt

[57] ABSTRACT

A splice closure for environmental protection of aerial cable splices is provided. The splice closure includes a double-wall construction facilitating closure strength, construction and operation. A preferred construction is provided which facilitates extension of an intact closure, by means of a one-half section cut from a second, identical, closure. A trough and drain arrangement facilitates drainage of water from an interior of the closure, to the environment. Preferred orientation of an opening hinge in the closure, facilitates access to an enclosed cable splice area. A preferred arrangement is provided, for association of end cap arrangements with the closure.

22 Claims, 5 Drawing Sheets

CABLE CLOSURE

FIELD OF THE INVENTION

The present invention relates to the cable splice closures, in particular to a double-wall cable splice closure. The invention particularly concerns cable splice closures such as may be used in the electrical transmission and telecommunications industries as aerial closures.

BACKGROUND OF THE INVENTION

Cables, such as telecommunication cables, may carry hundreds and sometimes thousands of pairs of insulated wires, enclosed within flexible shields or tubular sheaths. When two or more cable ends are joined together, as for example when extending a cable or when tapping into an extended cable, a splice or splice area is created. The splice area should be enclosed for protection from the environment. For example, if the closure is an aerial closure, used with aerially suspended cables, protection against damaging interference from weather elements, animals, plants and so forth necessary.

Structures or arrangements for enclosing such portions of cables are frequently referred to as "splice closures". Such closures are typically adapted to enclose therein at least two, and sometimes more, "cable ends." The term "cable end", and variants thereof as used herein, refers to an area of exposure of insulated conductors, i.e., wires and any additional wrappings or coverings involved.

Splice closures generally comprise an elongate, typically cylindrical, outer casing having first and second opposite ends. Cables to be joined at the splice area(s) are generally directed into the casing through the casing ends. At each of the casing ends, seal means are provided in order to ensure an environmental seal around the cables, i.e. between the cables and the interior of the cable closure.

One type of closure, of particular importance, is generally referred to as the "aerial closure". An aerial closure is adapted to be used when suspended in the air, typically from a support cable or the like. Through the use of such a closure, a cable splice for suspended cables is accommodated. Typically, means are provided to ensure a conductive, and therefore grounding, contact between the cable sheaths of cables spliced in the closure.

There are a number of problems and features which it is generally desirable that a cable enclosure address. The major ones of these relate to, and concern, the following:

A sealing arrangement with cables extending into the cable closure must be provided. In some arrangements this may be provided by means of structural members permanently mounted on the enclosure. In others, separable end caps or washers may be utilized in association with the closure. When this latter type of arrangement is used, it is necessary and desirable for the closure to include means facilitating mounting and positioning of the end caps or washers therein.

The closure should be readily mountable around an aerial cable splice, or the like. This is facilitated by appropriate hanger means for association with the support cable, and also appropriate means for permitting the enclosure to be selectively opened or closed, around an associated cable splice and end cap arrangements that fit over existing cables.

Preferably, a multi-piece system is avoided. Conventional multi-piece systems can be difficult to assemble, especially by workers supported by a ladder, bucket system or the like. The problems are exacerbated if the worker is operating under adverse conditions, such as in high winds or otherwise inclement weather.

Occasionally it may be necessary to gain access to an enclosed cable splice area. It is preferred that a cable splice closure be readily manipulatable to provide access to the interior thereof, and any enclosed cable splice arrangement. Preferably, the arrangement is such as to generally inhibit unintended or inadvertent opening. However, preferably a quick opening system is provided, for convenience. Most preferably, the arrangement is such that opening can be accomplished without removal of the arrangement from an associated support cable.

Also, once the closure is opened it may be necessary for a worker to manipulate elements inside. Preferably, the arrangement is organized such that when opened, many portions of the cable splice(s) are in view, and are readily accessible for maintenance.

Cable splices may be of a variety of types, and include fairly simple two-cable arrangements as well as very complex multi-cable arrangements. Some arrangements may be very large in transverse or longitudinal extension, whereas others may be very small. It would be preferred that a cable enclosure arrangement be selectively adjustable or extendable in length, to accommodate cable splices requiring greater volume.

A cable enclosure should provide a good protective shield to the environment. Preferably means are provided to limit water leakage, for example from rain, to an interior thereof. Also, preferably means are provided for drainage of water from an interior of the cable enclosure, should any leakage occur.

It is also preferred that cable closures include means insulating the cable splice from sudden changes in temperature. Preferably this is accomplished at a relatively low cost, and without a substantial increase in complexity of manufacture.

It is also preferred that the closure system be readily manufactured in a relatively inexpensive manner, and by mass manufacturing techniques.

A wide variety of cable closure systems have been developed, some of which include features directed to at least some of the above related concerns. In general, however, no conventional, substantially universal, closure has been developed which readily and satisfactorily can meet all of the above concerns or meet certain selected ones in convenient manners. Such a closure has, however, been needed, since many closures are used in industries such as the telecommunications industry.

OBJECTS OF THE INVENTIONS

It is an object to the present invention to provide a unique cable closure arrangement for use in enclosing and protecting cable splices.

It is an object of the invention to provide an enclosure which may include: means providing insulation of an enclosed splice from the environment; means for extendibility as necessary in use; means facilitating mounting of end cap arrangements therein; means providing for preferred drainage of water therefrom; means facilitating mounting in association with an aerial support cable or the like; means facilitating a relatively rigid structure with the use of relatively little construction material; means facilitating opening and closing, as necessary, in use; and, means facilitating access to an enclosed cable splice, after the closure has been installed.

It is also an object to the present invention to selectively provide for the above related features in an arrangement manufacturable by means of blow molding.

It is another object to the present invention to provide a preferred such cable closure structure with a double-wall configuration.

Other objects and advantages of the present invention will become apparent from the following descriptions, taken in connection with the accompanying drawings, wherein, by way of illustration and example, an embodiment of the present invention is disclosed.

SUMMARY OF THE INVENTION

The present invention concerns a cable closure for use in providing environmental protection to a cable splice or the like. Cable closures according to the present invention are particularly well-adapted for use as aerial closures, i.e. in use suspended from a support cable or the like.

The preferred cable closures comprise a generally cylindrical casing formed as a single unit or piece, with a longitudinal hinge extending completely along a sidewall thereof. The hinge permits the closure to be opened along an opposite opening seam as necessary, for example during installation about a cable splice and/or for access to an enclosure cable splice. Preferably, the hinge is a compression molded hinge. The term "compression molded hinge", as used herein, is meant to refer to a hinge which is formed as an integral part of the closure casing, for example during molding.

The preferred enclosure also includes means facilitating mounting to an aerial support cable. Preferably, the means is such that when mounted, and opened along the hinge line, the closure is oriented to provide a good viewing of, and convenient access to, an enclosed cable splice. This, it will be understood, is accomplished in the preferred embodiment by providing for orientation of mounting members, on the casing, rotationally about 125°-145°, and preferably about 135°, around the said casing, from the hinge, when the hinge is positioned substantially in the center of said circular casing, i.e. approximately 180°, rotationally, from the openable or opening seam. In general, this results from providing the casing with first and second halves or members, separated along the hinge; and, by mounting the casing to the cable by means positioned about 125°-145° around the casing first half, from the hinge.

Preferred enclosures according to the present invention have a double-wall construction. The provision of a double-wall throughout substantial sidewall portions of the closure, facilitates insulation against sudden changes in temperature. Further, the double-wall construction facilitates overall casing rigidity and integrity, with a light-weight construction. Also, the double-wall construction provides a second layer of protection against exterior damage, for example against wind, ice or hail damage. Finally, the double-wall structure facilitates provision of features such as a water drain or trough means in an interior of the casing, to preferentially direct any water, which may leak therein, outwardly from the casing and away from an enclosed cable splice.

Preferred closures according to the present invention are adapted to be utilized in association with end cap arrangements, positionable generally at opposite ends thereof to provide a sealing arrangement with associated cable members directed to the splice. End cap arrangements affording changes in relative alignment of cables directed into the closure are preferred. A variety of end cap arrangements may be utilized in association with closures including the above features. Preferred, is a cooperating tab and recess arrangement. In a particular preferred embodiment, a mounting tab means is provided in a selected portion of the enclosure, so that even when the closure is opened, the end cap arrangement is maintained secured in a selected position.

Preferred closures according to the present invention are readily extendable, generally by means of associating therewith an extension. Preferred enclosures include a center line, cut-line, or portion across which the closure can be readily cut or separated, for example into two opposite, generally cylindrical halves. In this manner, any selected closure according to preferred embodiments can be cut in half to provide end extensions for another, uncut or intact, closure. Intact closures can be increased in length by one-half units.

To accommodate such extension, the casing is provided with a central portion, and first and second opposite end portions. The cut-line is centrally positioned in the central portion; dividing same into first and second sections. The casing is thus readily separable into two members, each comprising a section, preferably about half, of the original casing central portion and each having an end portion thereon; the separated sections being substantially mirror images of one another.

Each central portion section includes an end portion-receiving area therein, substantially adjacent the cut-line. After a closure has been separated along the cut line, each resulting section can be used to engage and extend an intact closure, by receipt of an end portion on the intact closure into the end portion-receiving area of the separated section. Generally, extension is accomplished by opening of the closure half-section, or extension, along its opening seam, and then enclosing same about a closed end portion of the intact closure.

In the preferred embodiment interlocking means are provided to facilitate a secure, environmentally resistent, engagement with respect to both longitudinal and rotational stresses between engaged pieces. Preferably, a cooperating tongue and groove arrangement is provided.

Preferred enclosures according to the present invention may be blow molded from plastics, such as polyethylene materials. It is an advantage of the present invention that the structure described can be blow molded, with a double-wall construction, using normal parison techniques.

The drawings constitute a part of this specification and include exemplary embodiments o the invention, which may be embodied in various forms. It is to be understood that in some instances relative component sizes, and material thicknesses, may be shown exaggerated to facilitate an understanding of the invention.

BRIEF DESCRIPTION OF THE DRAWINGS

FIG. 4 is a front elevational view of a closure according to the present invention; FIG. 4 generally illustrating the closure opened along a hinge thereof, with the view being of an interior of the closure.

DETAILED DESCRIPTION OF THE INVENTION

As required, detailed descriptions of the preferred embodiment are provided herein. It is to be understood, however, that the present invention may be embodied in various forms. Therefore, specific structural and functional details disclosed herein are not to be interpreted as limiting, but rather as a basis for the claims and as a representative basis for teaching one skilled in the art to employ the present invention in virtually any appropriately detailed system, structure or manner.

Figure 1:
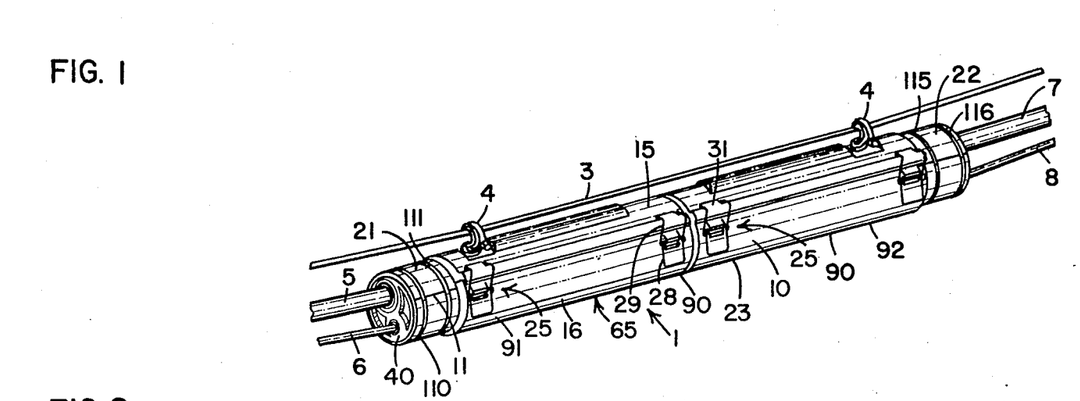
FIG. 1 is a fragmentary, perspective, environmental view of a closure according to the present invention shown in use: enclosing a cable splice arrangement involving four cables; and, suspended from a support cable.

Referring to FIG. 1, the reference numeral 1 generally designates a splice closure according to the present invention, represented in a typical environment of use. More specifically, splice closure 1 is shown suspended from a support cable 3, by hanger means including hangers 4. Four cables, 5, 6, 7 and 8 are shown extending into an interior of splice closure 1, toward a cable splice arrangement enclosed therein.

Still referring to FIG. 1, splice closure 1 comprises a casing 10 openable along an edge or opening seam 11. Generally, casing 10 comprises first and second sections 15 and 16, hingedly connected to one another along a hinge line 18, FIG. 2. For the preferred embodiment, hinge line 18 is defined by a compression molded hinge 19. That is, hinge 19 is integral with casing sections 15 and 16. Preferably casing 10 is molded from a durable plastic, such as a polyethylene or the like. In this manner, hinge 19 can be readily formed integrally with the casing sections 15 and 16, when molded. Preferred casings 10 according to the present invention are blow molded, and in fact it is an advantage of the present invention of the casing design chosen is susceptible to manufacture by blow molding techniques, in a relatively inexpensive and rapid manner. Preferably each section 15 and 16 is about a one-half side of the casing 10. That is, each of sections 15 and 16 is substantially semi-cylindrical in configuration.

Referring again to FIG. 1, for the preferred embodiment casing 10 has an elongate, substantially cylindrical, shape with first and second opposite end portions 21 and 22, mounted on, secured to or integral with, a central portion 23. Preferably, the casing 10 has an integral structure. The cylindrical casing 10 is selectively maintained secured in a closed conformation, FIG. 1, by latch means or arrangements 25. Latch arrangements 25 may be any of a variety of conventional arrangements whereby section 16 can be selectively maintained secured to section 15, along seam 11. For the embodiments shown, each latch arrangement 25 includes an actuator handle 28 and a securing latch 29, see FIG. 13 and 14. The securing latch 29 is organized such that an extension 31 on section 15 can be readily engaged thereby. Actuator handle 28, in a conventional manner, can be operated to apply leverage to the securing latch 29, drawing the extension 31 toward the section 16, or vice versa. In this manner the casing 10 can be readily closed, and opened, as desired. Further, latch arrangement 25 can be readily operated, when necessary, to provide access to an interior of the casing or canister 10. Further detail concerning latch arrangements 25 is presented below, with respect to a discussion of FIGS. 13 and 14.

Figure 2:
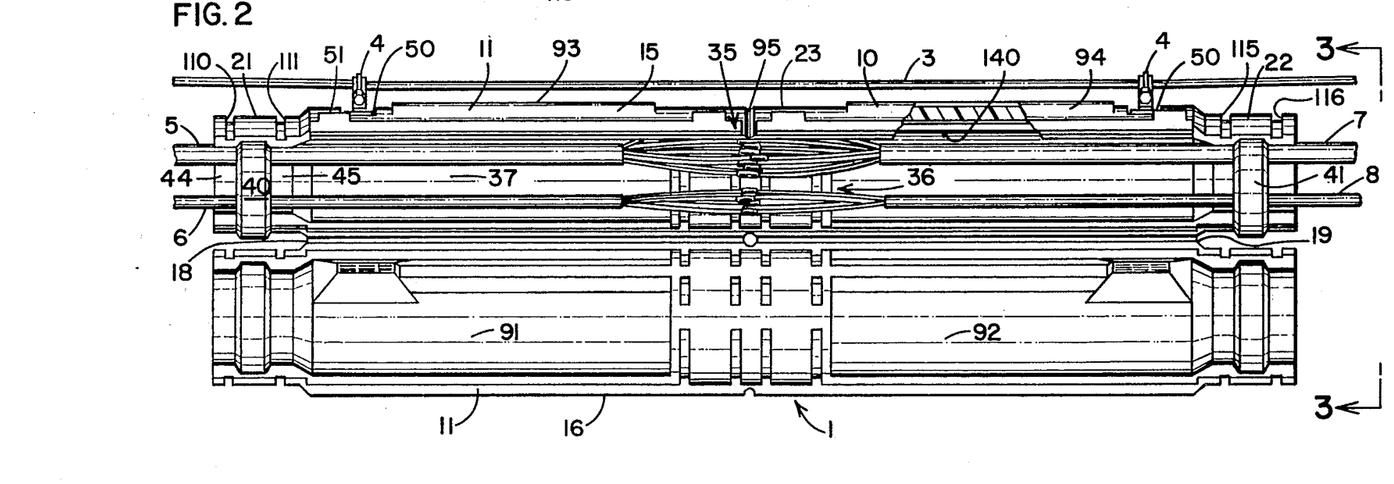
FIG. 2 is an enlarged, fragmentary, front elevational view of the environment shown in FIG. 1, but with the closure indicated in an open orientation, for viewing and access to otherwise enclosed cable splice areas.

In FIG. 2, casing 10 is shown opened along seam 11; i.e. section 16 is swung open and downward around hinge 19, with respect to section 15. As a result, the inside of casing 10 is viewable. Cables 5 and 7 are represented as spliced to one another at splice area 35, and cables 6 and 8 are shown spliced to one another at splice area 36. It is, of course, a major functional purpose for casing 10 to provide protection for the splice areas 35 and 36. It is to be understood that the splice areas 35 and 36 depicted are representative only, and a variety of types, or arrangements, may be involved.

Extension of each of the cable members 5, 6, 7 and 8, is from the exterior environment to an interior 37 of the casing 10. Generally, sealing engagement is necessary and desirable between each of the cables 5, 6, 7 and 8 and the casing 10, to provide for an environmental seal. A variety of means may be utilized as the seal means, or end seal means, for the casing 10. For the embodiment depicted in the drawings, the end seal comprises first and second opposite end cap arrangements 40 and 41, positioned in opposite end portions or sections 21 and 22 respectively, of the casing 10. The particular end cap arrangements 40 and 41 depicted each comprise a circular sealing member having a pair of apertures therethrough, to accommodate two cables, for example cables 5 and 6 for arrangement 40, in a sealing manner.

Each end cap arrangement 40 and 41 includes, in association therewith, a pair of opposite mounting ears, for example ears 44 and 45 for arrangement 40, FIG. 2. The mounting ears are preferably flexible extensions of rubber, or thermoplastic rubber material, which can be snap-fit or friction-fit into a securing or retaining means comprising tab arrangements formed in casing section 15. Mounting tabs, for receipt of mounting ears 44 and 45, are discussed in further detail below with respect to other features of the casing 10. It is noted that since the casing 10 is adapted to include mounting tabs in section 15, i.e. an upper half of the casing, when the casing 10 is opened, FIG. 2, the end cap arrangements 40 and 41 remain attached to, and suspended from, casing section 15, thus maintaining the splice areas 35 and 36 fixed in position. This is advantageous, as it facilitates repair and replacement operations.

Splice closure arrangements according to the present invention include numerous advantageous features. Some of these relate to and concern the following: provision of means facilitating access to enclosed splice areas, such as areas 35 and 36, for maintenance and repair; provision of means facilitating insulation from the environment; means affording rigid structure; provision of means facilitating drainage of rain water or the like which may collect within the interior 37; and, provision of means facilitating extension of the casing 10, as may be necessary to cover larger splice areas. For the preferred embodiment, these features are provided by the following structures and elements.

Figure 3:
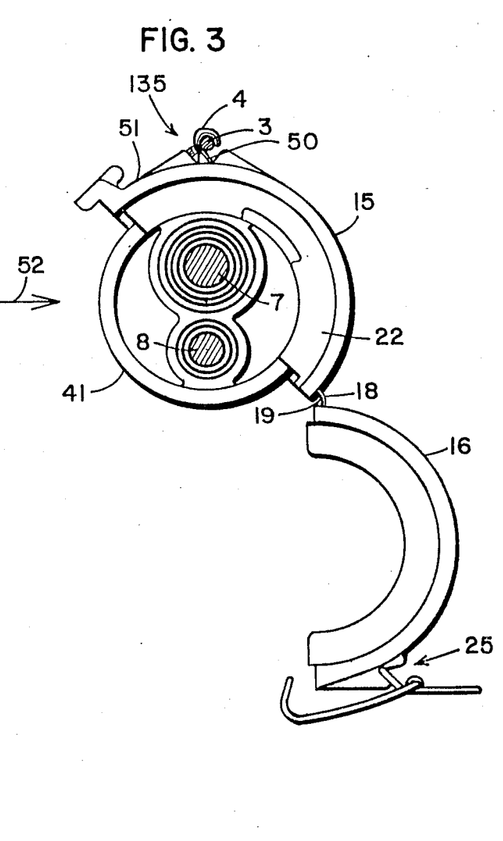
FIG. 3 is an end elevational view of the arrangement shown in FIG. 2, taken from the orientation of line 3—3, FIG. 2.

First, as will be apparent by examination of FIGS. 2 and 3, ease of access to an enclosed splice area, such as splice areas 35 and 36, is facilitated by the rotational position of (upper) half 15 of the casing 10, relative to the splice areas 35 and 36. In particular, preferably section 15 is rotationally oriented with respect to the splice areas 35 and 36 such that when (bottom) section 16 is opened, a substantially unobstructed view is provided to the splice areas 35 and 36. This is accomplished by preferred positioning of the hinge line 18, rotationally, relative to the attachment area for the closure 10, or the hanger means, i.e. the hanger members 4. Specifically, the hinge line 18 is rotationally positioned between about 125° to 145°, and preferably about 135°, from attachment points or areas 50, whereat the hanger members 4 are secured to casing 10, mounting same on the cable 3. As a result, a slight overhang area of cover 51 in section 15 is provided. However, area 51 does not substantially block view of, or access to, splice areas 35 and 36. This is readily understood by examination of FIG. 3, wherein it is illustrated that the splice areas could be readily viewed from the direction of arrow 52.

Figure 4:
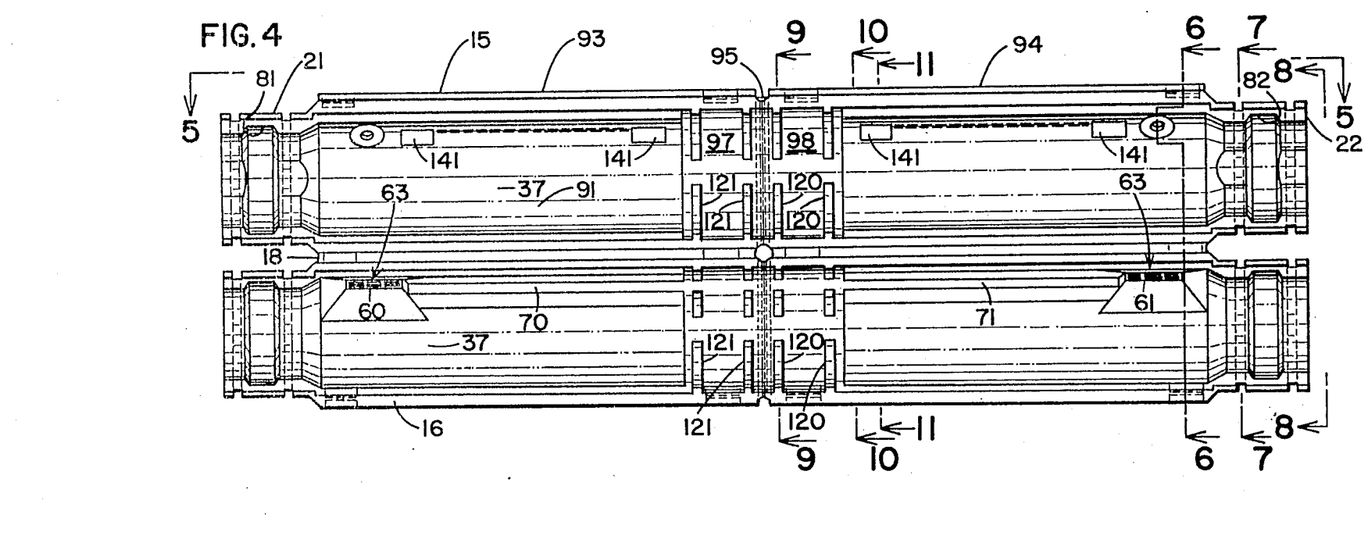
Figure 5:
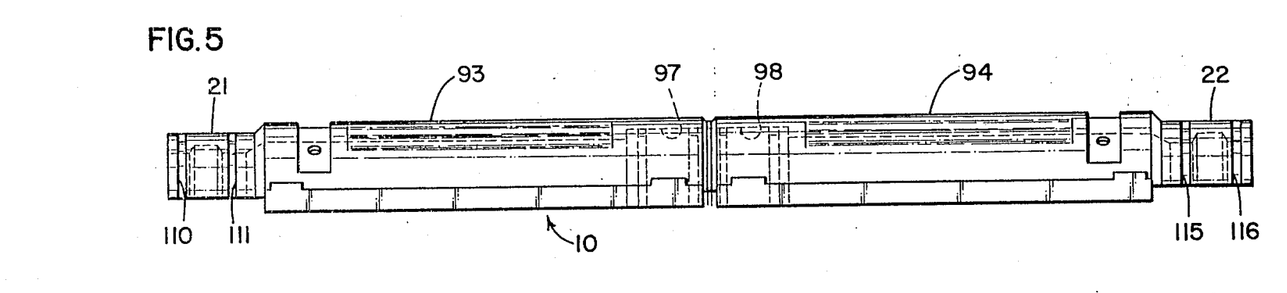
FIG. 5 is a side elevational view taken generally from the perspective of line 5—5, FIG. 4.

In FIG. 4, the casing 10 itself is depicted. The drawing (FIG. 4) illustrates the casing 10 opened along the hinge line 18. The viewer's perspective is looking toward an inside 37 of the casing 10, i.e. the inside of each casing section 15 and 16. In FIG. 5, the arrangement of FIG. 4 is depicted from a side elevation, as defined. FIGS. 6–11 show various end elevational and cross-sectional views, defined by lines in FIG. 4. The casing 10 shown in FIG. 4 is substantially the same as that shown in FIGS. 1–3, except FIG. 4 is not an environmental view.

As will be understood from the casing cross-sections illustrated in FIGS. 6, 7, 9, 10 and 11, many sidewall portions of the casing 10 have a double-wall structure. That is, they have an inner wall 54 and an outer wall 55, with cavity or insulating space(s) 56 therebetween. Spaces 56 act against sudden changes in ambient temperature, to insulate the interior 37 of the closure and protect against the weather causing sudden changes in temperature of the splices. The double wall increases the time for temperature inside and outside to reach equilibrium. The double wall also inhibits formation of condensation on the splices, due to the insulating capabilities.

In a typical embodiment, insulating spaces 56 are air-filled insulating spaces only, and are not filled with other insulation materials. However, if desired, parts, not shown, can be provided in the outer wall 55, whereby insulating spaces 56 could be filled with some other form of insulation material. It is noted that the double wall also provides for significant impact protection.

It will be readily understood, by examination of all figures, that not all portions of the casing 10 have the spaced double-wall construction, however substantial portions do. Portions 57 and 58, FIG. 6 of the casing 10, in the areas of hanger points 50 and hinge line 18 respectively, are not formed from spaced inner and outer walls; however in the areas of hanger points 50, the wall is formed from compressed double walls, for extra strength. Also, certain portions associated with the drainage means, described below, are provided with a single wall rather than a double-wall arrangement. Further, certain portions in association with a center transition section, cut-line or break line, as described below, are not formed from spaced inner and outer walls.

The double-wall construction generates advantages beyond simply insulation capabilities. First, protection against damage to splice areas, such as areas 35 and 36, due to an unexpected failure of the casing 10 is provided. For example, should the outer wall 55 split or sustain hail or wind damage, the inner wall 54 will substantially protect the splice areas 35 and 36, until repair or replacement.

Also, the double-wall construction provides a strong, rigid, yet lightweight, arrangement. Further, it can be readily constructed utilizing conventional molding techniques, especially conventional blow molding techniques.

Another advantageous feature introduced into the splice closure 1 concerns drainage means providing for drainage of interior water, for example as might leak into the splice closure 1 during a rainstorm or the like, away from splice areas 35 and 36, and outwardly from interior 37 of the casing 10. The drainage means of the preferred embodiment is constructed in a manner which takes advantage of the double-wall construction.

Referring to FIG. 4, (bottom) section 16 of the casing 10 includes first and second opposite drainage port areas 60 and 61 therein. Each of drainage port areas 60 and 61 includes a plurality of slits 63 which communicate between an interior 37 of the casing 10, and exterior of the entire splice closure 1. It will be understood that water can leak outwardly through slits 63, from an interior 37 of the casing 10. Preferably, drainage areas 60 and 61 are positioned such that when the casing 10 is closed, FIG. 1, the drainage areas are centered around a bottom-most portion 65 of the suspended closure 1.

Figure 6:
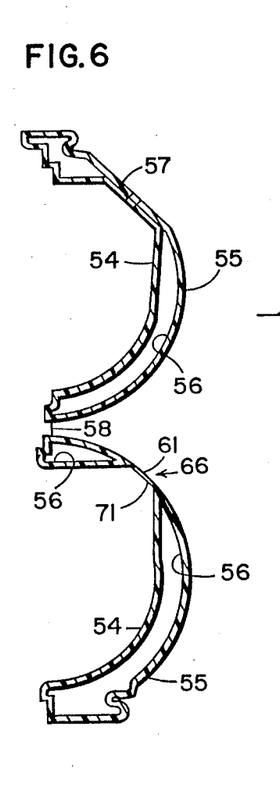
FIG. 6 is an enlarged, fragmentary, cross-sectional view generally taken along line 6—6, FIG. 4.

One of the drainage areas 61 is viewable in cross-section in FIG. 6. Upon examination of FIG. 6 it will be apparent that the slits 63 extend through a portion 66 of the casing 10 which is not double-walled. Thus, leakage into cavity 56 between the walls 54 and 55 is unlikely.

For the preferred embodiment, the drainage means includes flow-directing means to direct water flow in the interior 37 toward the opposite drainage port areas 60 and 61. For the embodiment depicted, FIG. 4, the flow directing means comprises troughs 70 and 71 directed towards drainage areas 60 and 61 respectively. Each of troughs 70 and 71 becomes deeper at its associated drainage port area (60 and 61 respectively), and thus each trough acts as a funnel or channel directing water toward the drainage port areas 60 and 61. It is noted that for the preferred embodiment the troughs 70 and 71 are formed in the inner wall 54. Thus, the double-wall construction facilitates formation of drainage means, including troughs 70 and 71, with a relatively small amount of construction material used, and without generation of undesired surface features in the outer wall 55.

Referring again to FIG. 2, it is noted that the end cap arrangements 40 and 41 are secured within top-half 15 of casing 10, and prevented from rotational movement relative thereto, by mounting ears 44 and 45 as previously discussed.

Figure 8:
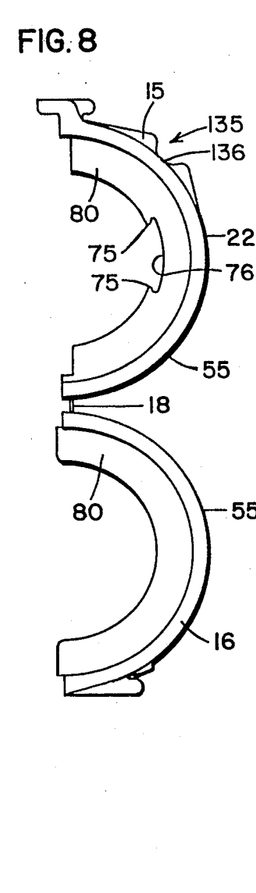
FIG. 8 is an enlarged, fragmentary, end elevational view taken generally from the point of view of line 8—8, FIG. 4.

In FIG. 8, an end elevational view of the casing 10 is illustrated. FIG. 8 is generally taken from the perspective of line 8—8, FIG. 4, and comprises an end view of end portion 22. Mounting tabs 75, for engaging a mounting ear on an associated end cap arrangement 41 are shown. Mounting tabs 75 generally define a receiving recess or slot 76, into which a flexible mounting ear or the like can be snapped. It will be understood that tabs 75, when engaged by a mounting ear on an associated end cap arrangement 41, FIG. 2, generally prevent rotational movement of the end cap arrangement 41 relative to casing 10. Further, tabs 75 prevent end cap arrangement 41 from falling out of casing 10, when opened as illustrated in FIG. 2. Also, lip 80 partially encloses end cap arrangement 41, protecting same.

Generally, the end cap arrangements 40 and 41 are received within recesses 81 and 82, FIG. 4. As a result of this construction, the end cap arrangements 40 and 41 are inhibited from longitudinal movement, and a good secure seal is provided.

It is noted that recesses 81 and 82 are provided in end sections 21 and 22 respectively of the casing 10. Referring to FIG. 1, it is also noted that end sections 21 and 22 are of a substantially smaller outside diameter than central portions 90 of the casing. For preferred embodiments, end sections 21 and 22 are sized smaller than the interior diameter of receiving areas oriented in sections 91 and 92 respectively. This results in advantages relating to extendibility of casing 10, as described below and illustrated by FIG. 12.

Referring to FIG. 4, casing 10 includes a first section (half) 93 and second section (half) 94, which engage one another along a center line 95. Preferably central line 95 is break line, or cut-line, along which casing 10 can be readily cut in half, i.e. separated. Most preferably in the area of center line 95 a compressed, double-wall, arrangement is provided, for strength. Once a casing 10 is broken along the center line 95, either half may be used to extend another, substantially identical but intact, casing 10. For example, section 93 could be used in FIG. 1, by attachment to end section 21, to extend the arrangement shown. Further, section 94 could be used with the arrangement shown in FIG. 1, to extend end section 22, FIG. 12. It will be understood that this is generally accommodated by providing a diameter at portions 97 and 98, FIGS. 4 and 5, sufficiently large to encircle and enclose therein end sections 21 and 22 respectively. In particular, each portion 97 and 98 is an end portion-receiving area appropriately sized for receipt therein of an end portion of another closure.

Figure 12:
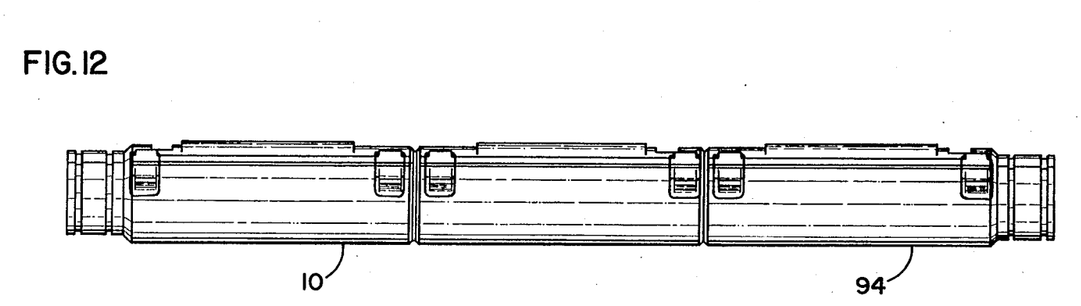
FIG. 12 is an enlarged, side elevational view of a closure according to the present invention shown extended by a one-half section taken from a second closure according to the present invention.

It is also noted that each section would bring, therewith, a trough and drainage area, to the overall extended construction, FIG. 12. Of course, more than one extension could be provided in association with a intact casing. Further, half-sections could be attached to one another.

Preferably, interlocking means are provided to ensure secure arrangement of an extension, for example, sections 93 and 94, with an associated end section, for example, end sections 21 and 22. For the preferred embodiment, this is provided by a tongue and groove interlocking arrangement. A variety of such systems are possible, the one illustrated being exemplary, convenient and efficient. Referring to FIGS. 1 and 5, each end section includes a pair of parallel grooves therein. For example, end section 21 includes grooves 110 and 111, and end section 22 includes grooves 115 and 116. Sections 97 and 98, FIG. 4, include tongues or ridges thereon, sized and spaced to engage or cooperate with grooves 110 and 111, or 115 and 116 as necessary. For example, section 98 includes tongues 120, spaced and sized to be received within grooves 115 and 116; and, section 97 includes tongues 121, sized and spaced to be received within grooves 110 and 111. It will be readily understood that such an arrangement facilitates extension, by an intact casing, in increments using separated sections from a similar casing.

Figure 7:
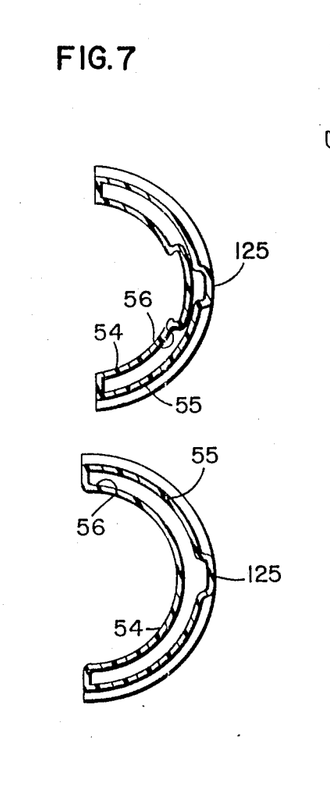
FIG. 7 is an enlarged, fragmentary, cross-sectional view taken generally along line 7—7, FIG. 4.
Figure 9:
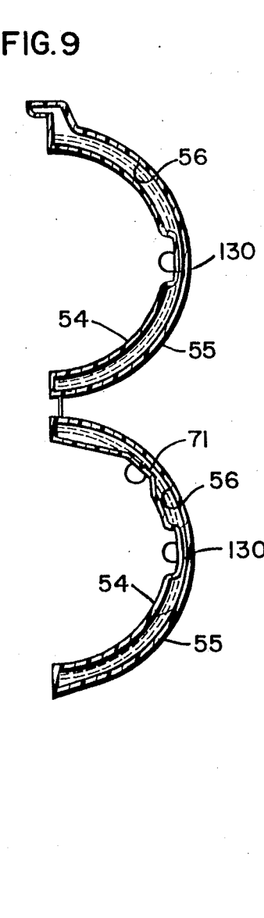
FIG. 9 is an enlarged, fragmentary, cross-sectional view taken generally along line 9—9, FIG. 4.
Figure 10:
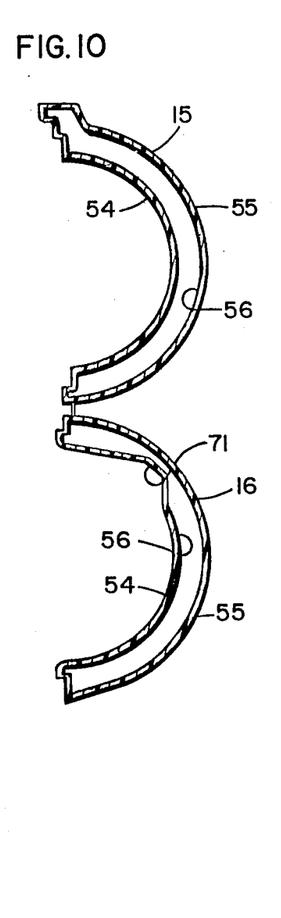
FIG. 10 is an enlarged, fragmentary, cross-sectional view generally along line 10—10, FIG. 4.
Figure 11:
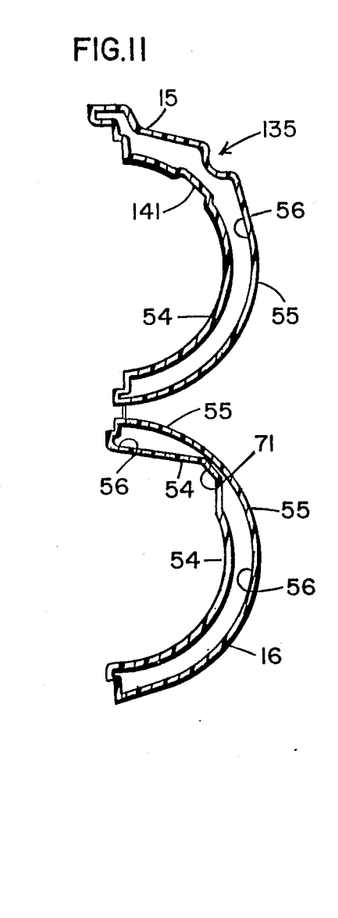
FIG. 11 is an enlarged, fragmentary, cross-sectional view taken generally along line 11—11, FIG. 4.

Rotational movement of an extension or section, relative to an associated casing 10, is also inhibited through interlocking interaction. Referring to FIG. 7, each groove has at least one, and preferably at least two, tongues, blocks or posts 125 therein. Also, preferably, each of sections 97 and 98 includes an associated recess between tongues, for example recesses 130, FIG. 9. The recesses 130, FIG. 9, are rotationally oriented to interlock with blocks 125, during extension of the casing 10. Thus, relative rotational movement between mated sections is inhibited. It is noted that in FIG. 9 the inner wall includes two oppositely positioned recesses 130, to engage two blocks 125. It is also noted that the tongue/groove arrangement is facilitated by the double-wall structure.

The arrangement described and shown includes other features of significance. Referring to FIG. 8 for example, the casing outer wall 55 includes a rib/groove arrangement 135 thereon. This arrangement 135 is generally aligned with hangers 4, or hanger mounting areas 50, FIGS. 3 and 1. That is, the rib/groove arrangement 135 is centered around a top-most portion 136 of casing 10. The rib/groove arrangement 135 provides for an alternative method of mounting casing 10. Specifically, hanger members 4 could be eliminated, and a band system, not shown, could be used to attach the casing 10 to cable 3, FIG. 3. Specifically, the cable 3 could be nested in the groove of the rib/groove arrangement, to orient a casing 10 properly. The rib/groove arrangement 135 would also ensure proper positioning of each casing section 93 and 94 of an extended closure, relative to the support cable 3.

In some embodiments an elongate hanger bar 140, FIG. 2, may extend between hanger members 4, along the interior 37 of casing 10. Such a hanger bar may be used to ensure electrical conduction between portions of hanger members 4 within casing 10. Also, such hanger bars may strengthen the system and provide a site for securing the cables and splice area. In particular, cables 5, 6, 7 and 8 could be tied or banded to the hanger bar, for secure anchoring.

Means are provided in the casing 10 to facilitate such anchoring by means of bands. In particular, FIG. 4, clearance portions 141 facilitate extension of a mounting band about an associated hanger bar, not shown. As section 141 is viewable in cross-section, in FIG. 11.

Figure 13:
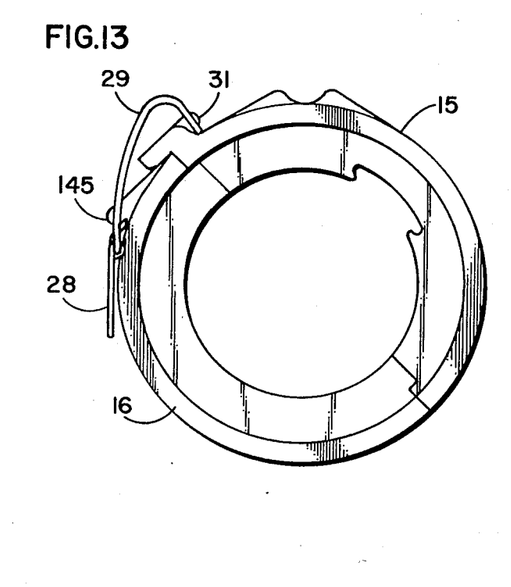
FIG. 13 is an enlarged, schematic, end elevational view of a closure according to the present invention; the drawing illustrating a preferred latch system.
Figure 14:
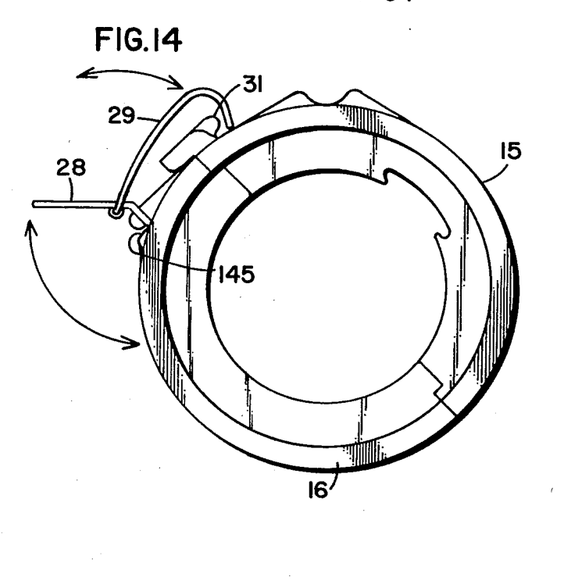
FIG. 14 is an enlarged, schematic, end elevational view of a closure according to the present invention; the drawing illustrating operation of the preferred latch arrangement of FIG. 13.

The latch arrangements 25 will be understood by reference to FIGS. 13 and 14. Operation of the handle 28 and latch 29, to secure the arrangement closed by drawing section 16 toward extension 31 is readily understood. Specifically, notch area 145 provides both for mounting of arrangement 25, and for a point of leverage. Operation is facilitated by the shapes chosen for handle 28 and latch 29.

It is to be understood that while certain embodiments of the present invention have been illustrated and described, the invention is not to be limited to the specific forms or arrangements of parts herein described and shown.

What is claimed and desired to be secured by letters patent is as follows:

1. A splice closure for providing environment protection to an aerial splice; said splice closure comprising:
   (a) an elongate generally cylindrical casing having a longitudinal hinge and a corresponding, generally oppositely positioned, opening seam; said casing having a sidewall section of double-wall construction defining an inner-wall portion and an outer-wall portion, with cavity area therebetween; said casing including first and second opposite end walls extending between said inner-wall portion and said outer-wall portion, to close ends of said double-wall construction; and,
   (b) latch means constructed and arranged for selectively retaining said casing in a closed orientation, along said opening seam.

2. A splice closure for providing environmental protection to an aerial splice; said splice closure comprising:
   (a) an elongate generally cylindrical casing formed of semi-cylindrical mating sections having: longitudinal hinge means joining two longitudinal edges; and, a corresponding generally oppositely positioned opening seam;
      (i) each of said casing sections having a wall section of double-wall construction defining an inner-wall portion and an outer-wall portion with at least one cavity area therebetween;
      (ii) said casing sections each including first and second opposite end walls extending between said inner-wall portion and said outer-wall portion to close ends of said cavity area; and,
   (b) latch means constructed and arranged for selectively retaining said casing in a closed orientation along said opening seam.

3. A splice closure for providing environmental protection to an aerial splice; said splice closure comprising:
   (a) an elongate generally cylindrical casing having a longitudinal hinge and a corresponding, generally oppositely positioned, opening seam; said casing having a sidewall section of double-wall construction defining an inner-wall portion and an outer-wall portion, with cavity area therebetween;
   (b) latch means constructed and arranged for selectively retaining said casing in a closed orientation, along said opening seam; and,
   (c) drainage means constructed and arranged for draining water outwardly from an interior of said casing.

4. A splice closure according to claim 3 wherein:
   (a) said cylindrical casing has a central portion and first and second opposite end portions;
      (i) said cylindrical casing having first and second sections separated by a central, circumferential, transition portion; and,
   (b) said drainage means includes a first drainage aperture area in said first casing section, and a second drainage aperture area in second casing section.

5. A splice closure according to claim 4, wherein:
   (a) said drainage means includes a flow-directing arrangement constructed and arranged to direct water in said casing first section toward said first drainage aperture area, and to direct water in said casing second section toward said second drainage aperture area.

6. A splice closure according to claim 5 wherein:
   (a) said first drainage aperture area is oriented in said casing substantially adjacent to said first end portion, and said second drainage aperture area is oriented in said casing substantially adjacent said second end portion; and,
   (b) said flow-directing means includes: a first trough extending from said transition portion to said first drainage aperture area; and, a second trough extending from said transition portion to said second drainage aperture area.

7. A splice closure for providing environmental protection to an aerial splice; said splice closure comprising:
   (a) an elongate generally cylindrical casing having a longitudinal hinge and a corresponding, generally oppositely positioned, opening seam; said casing having a sidewall section of double-wall construction defining an inner-wall portion and an outer-wall portion, with cavity area therebetween;
   (b) latch means constructed and arranged for selectively retaining said casing in a closed orientation, along said opening seam; and,
   (c) hanger means constructed and arranged for selectively mounting said casing to a support cable.

8. A splice closure according to claim 7 wherein:
   (a) said longitudinal hinge defines a hinge line dividing said casing into first and second, generally semi-cylindrical, casing members; and,
   (b) said hanger means defines an area of attachment of said casing first member to said support cable oriented between about 125° and 145°, radially, around said casing outer-wall portion, and in said casing first member, from said hinge line.

9. A splice closure according to claim 8 wherein:
   (a) said hanger means comprises a rib/groove arrangement on said casing outer-wall oriented to define a longitudinal groove between a pair of longitudinal ribs; said longitudinal groove generally being aligned with, and extending along, said area of attachment; said groove being positioned closer to said opening seam then to said hinge.

10. A splice closure for providing environmental protection to an aerial splice; said splice closure comprising:
    (a) an elongate generally cylindrical casing having a longitudinal hinge and a corresponding, generally oppositely positioned, opening seam; said casing having a sidewall section of double-wall construction defining an inner-wall portion and an outer-wall portion, with cavity area therebetween; said cylindrical casing further having a central portion and first and second opposite end portions;
       (i) said cylindrical casing central portion having a central, circumferential, cut-line portion, and said casing being readily separable along said cut-line portion into separable sections each of which has an end portion thereon;

(ii) each casing separable section having an end-portion-receiving area therein substantially adjacent said cut-line portion and sized for receipt of an end portion of an intact closure therein, after said cylindrical casing has been separated along said cut-line portion;

(b) whereby an intact first splice closure can be selectively extended by a casing section through attachment to the intact casing of a casing section generated by separating a second splice closure along said cut-line portion.

11. The splice closure according to claim 10 wherein:
(a) said casing includes interlocking means constructed and arranged for providing interlocking connection between a casing end portion-receiving area, of a casing section generated by separation of a casing along said cut line, and a casing end portion of an intact closure selectively received therein.

12. The splice closure according to claim 11, wherein:
(a) said interlocking means includes a first tongue and groove arrangement having: a groove arrangement on a first one of said casing end portions and, a tongue arrangement on first section end portion-receiving area; and,
(b) said interlocking means includes a second tongue and groove arrangement having: a groove arrangement on a second one of said casing end portions and, a tongue arrangement on second section end portion-receiving area.

13. A splice closure for providing environment protection to an aerial splice; said splice closure comprising:
(a) an elongate generally cylindrical casing having a longitudinal hinge and corresponding, generally oppositely positioned, opening seam; said casing having a sidewall section of double-wall construction defining an inner-wall portion and an outer-wall portion, with cavity area therebetween; said cylindrical casing further having a central portion and first and second opposite end portions;
(i) said first end portion having an end cap arrangement-receiving area therein;
(ii) said second end portion having an end cap arrangement-receiving area therein;
(iii) said longitudinal hinge defining an upper casing half, which includes parts of said first and second end portions, and a lower casing half, which includes parts of said first and second end portions; and,
(b) retaining means constructed and arranged for securing associated end cap arrangements in said upper casing half and in said first and second end portions.

14. A splice closure for providing environmental protection to an aerial splice; said splice closure comprising:
(a) an elongate generally cylindrical casing having a longitudinal hinge and a corresponding, generally oppositely positioned, opening seam; said casing having a sidewall section of double-wall construction defining an inner-wall portion and an outer-wall portion, with a cavity therebetween; and, said casing having a central portion and first and second opposite end portions;
(i) said casing central portion having first and second sections separated by a central portion;

(b) drainage means constructed and arranged for drainage water outwardly from an interior of said casing;
(i) said drainage means including: a first drainage aperture area oriented in said first casing section substantially adjacent to said first end portion; and, a second drainage aperture area oriented in said second casing section substantially adjacent to said second end portion;
(ii) said drainage means further including a first trough extending from said central portion to said first drainage aperture area, and a second trough extending from said central portion to said second drainage aperture area;
(c) hanger means constructed and arranged for selectively mounting said casing to a support cable; and,
(d) latch means constructed and arranged for selectively retaining said closure in a closed orientation, along said opening seam.

15. A splice closure according to claim 14 wherein:
(a) said central portion comprises cut-line portion; said casing being readily separable along said cut-line portion to form first and second separable sections each of which has an end portion thereon;
(i) said cylindrical casing central portion first section having an end portion receiving area therein substantially adjacent said cut-line portion and sized for receipt of a first end portion, of an intact closure, therein after said cylindrical casing has been separated along said cut-line portion; and,
(ii) said cylindrical casing central portion second section having an end portion receiving area therein substantially adjacent said cut-line portion and sized for receipt of a second end portion, of an intact closure, therein after said cylindrical casing has been separated along said cut-line portion;
(b) whereby an intact first splice closure can be selectively extended by a casing section through attachment to the intact closure of a casing section generated by dividing a second splice closure along said cut-line portion.

16. The splice closure according to claim 15 wherein:
(a) said casing includes interlocking means constructed and arranged for providing interlocking connection between a casing of an intact closure and a casing section of a separated closure.

17. A splice closure according to claim 16 wherein:
(a) a first one of said separable sections comprises a first section with an end portion thereon; and, a second one of said separable sections comprises a second section with an end portion thereon; and,
(b) said interlocking means includes first and second tongue and groove arrangements;
(i) said first tongue and groove arrangement having a tongue arrangement on said first section end portion-receiving area and a groove arrangement on said first section end portion; and,
(ii) said second tongue and groove arrangement having a tongue arrangement on said second section end portion-receiving area and a groove arrangement on said second section end portion.

18. A splice closure according to claim 14 wherein:
(a) said longitudinal hinge defines a hinge line dividing said casing into first and second, generally semi-cylindrical, halves; and, (b) said hanger means defines an area of attachment of said casing to said support cable oriented on said casing first half and between about 125° and 145°, radially, around said casing outer-wall portion, and on said casing first half, from said hinge line.

19. A splice closure according to claim 18 wherein:
(a) said hanger means comprises a rib/groove arrangement on said casing outer-wall oriented to define a longitudinal groove between a pair of longitudinal ribs; said groove generally being aligned with, and extending along, said area of attachment; said groove further being positioned closer to said seam than to said hinge.

20. A splice closure according to claim 19 wherein:
(a) said central portion comprises cut-line portion; said casing being readily separable along said cut-line portion to form two separable sections each of which has an end portion thereon;
  (i) each casing separable section having an end portion-receiving area therein substantially adjacent said cut-line portion and sized for receipt of an end portion of an intact closure therein, after said cylindrical casing has been separated along said cut-line portion;
(b) whereby an intact first splice closure can be selectively extended by a casing section through attachment to the intact casing of a casing section generated by separating a second splice closure along said cut-line portion.

21. The splice closure according to claim 20 wherein:
(a) said casing includes interlocking means constructed and arranged for providing interlocking connection between a casing of an intact closure and a casing section of a separated closure.

22. A splice closure according to claim 21 wherein:
(a) a first one of said separable sections comprises a first section with an end portion thereon; and, a second one of said separable sections comprises a second section with an end portion thereon; and,
(b) said interlocking means includes first and second tongue and groove arrangements;
  (i) said first tongue and groove arrangement having a tongue arrangement on said first section end portion-receiving area and a groove arrangement on said first section end portion;
  (ii) said second tongue and groove arrangement having a tongue arrangement on said second section end portion-receiving area and a groove arrangement on said second section end portion.

* * * * *